United States Patent
Murray

(10) Patent No.: US 11,180,636 B2
(45) Date of Patent: Nov. 23, 2021

(54) FUNCTIONALIZED INITIATOR, METHOD OF MAKING INITIATOR AND FUNCTIONALIZED ELASTOMER

(71) Applicant: The Goodyear Tire & Rubber Company, Akron, OH (US)

(72) Inventor: Aaron Patrick Murray, Chardon, OH (US)

(73) Assignee: The Goodyear Tire & Rubber Company, Akron, OH (US)

( * ) Notice: Subject to any disclaimer, the term of this patent is extended or adjusted under 35 U.S.C. 154(b) by 258 days.

(21) Appl. No.: 16/402,269

(22) Filed: May 3, 2019

(65) Prior Publication Data
US 2020/0347204 A1    Nov. 5, 2020

(51) Int. Cl.
| | |
|---|---|
| C08K 5/544 | (2006.01) |
| C08F 2/38 | (2006.01) |
| C08F 236/10 | (2006.01) |
| C08F 4/48 | (2006.01) |
| C08L 9/06 | (2006.01) |

(52) U.S. Cl.
CPC .............. *C08K 5/5477* (2021.01); *C08F 2/38* (2013.01); *C08F 4/48* (2013.01); *C08F 236/10* (2013.01); *C08F 2438/00* (2013.01); *C08L 9/06* (2013.01)

(58) Field of Classification Search
CPC ........ C08F 236/10; C08F 136/06; C08F 2/38; C08F 4/48; C08F 2438/00; C08C 19/25; C08C 19/22; C08C 19/44; B60C 1/0016; B60C 1/00; C08K 5/5477; C08L 9/06
See application file for complete search history.

(56) References Cited

U.S. PATENT DOCUMENTS

| | | |
|---|---|---|
| 5,110,967 A | 5/1992 | King et al. |
| 5,136,064 A | 8/1992 | King et al. |
| 5,239,099 A | 8/1993 | King et al. |
| 5,391,663 A | 2/1995 | Bening et al. |
| 5,565,526 A | 10/1996 | Schwindeman et al. |
| 6,518,214 B2 | 2/2003 | Halasa et al. |
| 6,686,504 B2 | 2/2004 | Halasa et al. |
| 6,693,160 B1 | 2/2004 | Halasa et al. |
| 7,879,945 B2 | 2/2011 | Hogan et al. |
| 8,450,512 B1 | 5/2013 | Piskoti et al. |
| 8,816,009 B1 | 8/2014 | Mazumdar et al. |
| 2017/0066854 A1 | 3/2017 | Joe et al. |
| 2018/0016424 A1 | 1/2018 | Hamann et al. |

OTHER PUBLICATIONS

European Search Report for Serial No. EP20171914 dated Jul. 30, 2020.

*Primary Examiner* — Angela C Scott
(74) *Attorney, Agent, or Firm* — Mandy B. Willis; John D. DeLong

(57) ABSTRACT

The present invention is directed to a functionalized polymerization initiator, comprising the reaction product of an alkyl lithium compound and a compound of formula 1

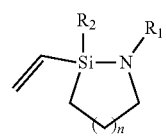

wherein $R_1$=alkyl (C1-C8), aryl, substituted aryl, or —$SiR_3$ where $R_3$ are independently C1-C8 alkyl, preferably —$SiMe_3$ where Me is methyl, or —$Si(CH_3)_2C(CH_3)_3$; $R_2$=C1-C8 alkyl, aryl, or substituted aryl, or —$SiR_3$, preferably —$CH_3$; and n=0-3. The invention is further directed to a method of making the functionalized inititiator, and a method of making a functionalized elastomer using the inititator.

3 Claims, No Drawings

FUNCTIONALIZED INITIATOR, METHOD OF MAKING INITIATOR AND FUNCTIONALIZED ELASTOMER

BACKGROUND

In recent years, there is a growing demand for functionalized polymers. Functionalized polymers can be synthesized through various living/controlled polymerization techniques. In the living polymerization process based on active carbanionic center, metals from Groups I and II of the periodic table are commonly used to initiate the polymerization of monomers into polymers. For example, lithium, barium, magnesium, sodium, and potassium are metals that are frequently utilized in such polymerizations. Initiator systems of this type are of commercial importance because they can be used to produce stereo regulated polymers. For instance, lithium initiators can be utilized to initiate the anionic polymerization of isoprene into synthetic polyisoprene rubber or to initiate the polymerization of 1,3-butadiene into polybutadiene rubber having the desired microstructure.

The polymers formed in such polymerizations have the metal used to initiate the polymerization at the growing end of their polymer chains and are sometimes referred to as living polymers. They are referred to as living polymers because their polymer chains which contain the terminal metal initiator continue to grow or live until all of the available monomer is exhausted. Polymers that are prepared by utilizing such metal initiators normally have structures which are essentially linear and normally do not contain appreciable amounts of branching.

This invention details synthesis of functionalized polymers. In general, to achieve the best tire performance properties functionalized polymers are highly desirable. In order to reduce the rolling resistance and to improve the tread wear characteristics of tires, functionalized elastomers having a high rebound physical property (low hysteresis) have been used for the tire tread rubber compositions. However, in order to increase the wet skid resistance of a tire tread, rubbery polymers that have a relatively lower rebound physical property (higher hysteresis) which thereby undergo a greater energy loss, have sometimes been used for such tread rubber compositions. To achieve such relatively inconsistent viscoelastic properties for the tire tread rubber compositions, blends (mixtures) of various types of synthetic and natural rubber can be utilized in tire treads.

Functionalized rubbery polymers made by living polymerization techniques are typically compounded with sulfur, accelerators, antidegradants, a filler, such as carbon black, silica or starch, and other desired rubber chemicals and are then subsequently vulcanized or cured into the form of a useful article, such as a tire or a power transmission belt. It has been established that the physical properties of such cured rubbers depend upon the degree to which the filler is homogeneously dispersed throughout the rubber. This is in turn related to the level of affinity that filler has for the particular rubbery polymer. This can be of practical importance in improving the physical characteristics of rubber articles which are made utilizing such rubber compositions. For example, the rolling resistance and traction characteristics of tires can be improved by improving the affinity of carbon black and/or silica to the rubbery polymer utilized therein. Therefore, it would be highly desirable to improve the affinity of a given rubbery polymer for fillers, such as carbon black and silica.

SUMMARY

The present invention is directed to a functionalized polymerization initiator, comprising the reaction product of an alkyl lithium compound and a compound of formula 1

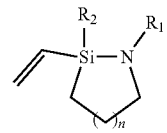

wherein $R_1$=C1—C8 alkyl, aryl, substituted aryl, or —$SiR_3$ where R is independently C1-C8 alkyl, preferably —$SiMe_3$ where Me is methyl, or —$Si(CH_3)_2C(CH_3)_3$; $R_2$=C1—C8 alkyl, aryl, or substituted aryl, or —$SiR_3$, preferably —$CH_3$; and n=0-3.

The invention is further directed to a method of making the functionalized inititator, and a method of making a functionalized elastomer using the inititator.

DESCRIPTION

There is disclosed a functionalized polymerization initiator, comprising the reaction product of an alkyl lithium compound and a compound of formula 1

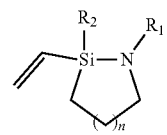

wherein $R_1$=C1—C8 alkyl, aryl, substituted aryl, or —$SiR_3$ where R is independently C1—C8 alkyl, preferably —$SiMe_3$ where Me is methyl, or —$Si(CH_3)_2C(CH_3)_3$; $R_2$=C1—C8 alkyl, aryl, or substituted aryl, or —$SiR_3$, preferably —$CH_3$; and n=0-3.

There is further disclosed a method of making the functionalized inititator, and a method of making a functionalized elastomer using the initiator.

In one embodiment, the compound of formula 1 is of formula 2

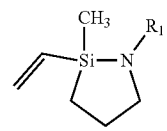

where R is a C1 to C3 alkyl group, or a trimethylsilyl group.

The functional initiator can be made by reacting the compound of formula 1 with initiators having the general structural formula P-M, wherein P represents an hydrocarbyl group and wherein M represents a metal of group I or II.

The metal used in the functional initiator is typically selected from the group consisting of barium, lithium, magnesium, sodium, and potassium. Lithium and potassium are the metals that are most commonly utilized in the synthesis of metal terminated polymers (living polymers). Normally, lithium initiators are more preferred.

Organolithium compounds are the preferred initiators for utilization in preparation of the functionalized initiator. The organolithium compounds which are utilized are normally organo monolithium compounds. The organolithium compounds which are preferred are monofunctional compounds which can be represented by the formula: R—Li, wherein R represents a hydrocarbyl radical containing from 1 to about 20 carbon atoms. Generally, such monofunctional organolithium compounds will contain from 1 to about 10 carbon atoms. Some representative examples of preferred initiators include n-butyllithium, sec-butyllithium, n-hexyllithium, n-octyllithium, tertoctyllithium, n-decyllithium, phenyllithium, 1-naphthyllithium, 4-butylphenyllithium, p-tolyllithium, 4-phenylbutyllithium, cyclohexyllithium, 4-butylcyclohexyllithium, and 4-cyclohexylbutyllithium. Secondary-butyllithium is a highly preferred.

To make the functional initiator, the compound of formula 1 is combined with an organolithium compound in a molar ratio ranging from 1:2 to 2:1, in a hydrocarbon solvent such as hexane. Polymerization modifiers such as TMEDA and the like may be added to the mixture. The mixture of compound of formula 1 and organolithium compound is then heated at a temperature ranging from 40 to 80° C. for a duration of 1 to 10 minutes to form functional initiator as the reaction product of the compound of formula 1 and the organolithium compound. The reaction product may be transferred in solution to a polymerization mixture of monomers in solvent to form a functionalized diene elastomer.

The amount of functional initiator utilized in a polymerization will vary depending upon the molecular weight which is desired for the rubbery polymer being synthesized as well as the precise polymerization temperature which will be employed. The precise amount of organolithium compound required to produce a polymer of a desired molecular weight can be easily ascertained by persons skilled in the art. However, as a general rule from 0.01 to 1 phm (parts per 100 parts by weight of monomer) of an organolithium initiator will be utilized. In most cases, from 0.01 to 0.1 phm of an organolithium initiator will be utilized with it being preferred to utilize 0.025 to 0.07 phm of the organolithium initiator.

In one embodiment, the monomers used to synthesize the functionalized elastomer include a first monomer and an optional second monomer, where the first monomer is a conjugated diene monomer and the second monomer is a vinyl aromatic monomer, As the first monomer, suitable conjugated diene monomers include 1,3-butadiene, isoprene, 1,3-pentadiene, 2,3-dimethyl-1,3-butadiene, 2-methyl-1,3-pentadiene, 2,3-dimethyl-1,3-pentadiene, 2-phenyl-1,3-butadiene, and 4,5-diethyl-1,3-octadiene, and the like.

Also, as the second monomer, suitable vinyl aromatic monomers include styrene, 1-vinylnapthalene, 3-methylstyrene, 3,5-diethylstyrene, 4-propylstyrene, 2,4,6-trimethylstyrene, 4-dodecylstyrene, 3-methyl-5-normal-hexylstyrene, 4-phenylstyrene, 2-ethyl-4-benzylstyrene, 3,5-diphenylstyrene, 2,3,4,5-tetraethylstyrene, 3-ethyl-1-vinylnapthalene, 6-isopropyl-1-vinylnapthalene, 6-cyclohexyl-l-vinylnapthalene, 7-dodecyl-2-vinylnapthalene, a-methylstyrene, and the like.

In one embodiment, the monomers used to synthesize the copolymer include 1,3-butadiene and styrene.

The copolymer is generally prepared by solution polymerizations that utilize inert organic solvents, such as saturated aliphatic hydrocarbons, aromatic hydrocarbons, or ethers. The solvents used in such solution polymerizations will normally contain from about 4 to about 10 carbon atoms per molecule and will be liquids under the conditions of the polymerization. Some representative examples of suitable organic solvents include pentane, isooctane, cyclohexane, normal-hexane, benzene, toluene, xylene, ethylbenzene, tetrahydrofuran, and the like, alone or in admixture. For instance, the solvent can be a mixture of different hexane isomers. Such solution polymerizations result in the formation of a polymer cement (a highly viscous solution of the polymer).

The functionalized elastomer can be produced using either a batch or continuous anionic polymerization process. The polymerization medium can include modifiers like tetramethylethylenediamine (TMEDA), sodium mentholate (SMT), ditetrahydrofurfurylpropane (DTP), tetrahydrofuran (THF), polyethers or their combinations. Branching agents, for example divinylbenzene, silicon tetrachloride etc, can also be used during polymerization.

After the polymerization reaction is completed, it will normally be desirable to "kill" any living polydiene chains which remain. This can be accomplished by adding water, an organic acid, or an alcohol, such as methanol or ethanol, to the polymer cement after the functionalization reaction is completed in order to eliminate any living polymer. The block copolymer can then be recovered from the solution utilizing standard techniques.

The functionalized elastomer may be compounded into a rubber composition. The rubber composition may include elastomers comprising the block copolymer alone, or may include the block copolymer along with additional elastomers as described below. Generally, in a composition including the block copolymer and additional elastomers, the rubber composition may include from 95 to 5 phr of the block copolymer, and optionally from 5 to 95 phr of additional elastomers.

The rubber composition may optionally include, in addition to the functionalized polymer, one or more rubbers or elastomers containing olefinic unsaturation. The phrases "rubber or elastomer containing olefinic unsaturation" or "diene based elastomer" are intended to include both natural rubber and its various raw and reclaim forms as well as various synthetic rubbers. In the description of this invention, the terms "rubber" and "elastomer" may be used interchangeably, unless otherwise prescribed. The terms "rubber composition," "compounded rubber" and "rubber compound" are used interchangeably to refer to rubber which has been blended or mixed with various ingredients and materials and such terms are well known to those having skill in the rubber mixing or rubber compounding art. Representative synthetic polymers are the homopolymerization products of butadiene and its homologues and derivatives, for example, methylbutadiene, dimethylbutadiene and pentadiene as well as copolymers such as those formed from butadiene or its homologues or derivatives with other unsaturated monomers. Among the latter are acetylenes, for example, vinyl acetylene; olefins, for example, isobutylene, which copolymerizes with isoprene to form butyl rubber; vinyl compounds, for example, acrylic acid, acrylonitrile (which polymerize with butadiene to form NBR), methacrylic acid and styrene, the latter compound polymerizing with butadiene to form SBR, as well as vinyl esters and various unsaturated aldehydes, ketones and ethers, e.g., acrolein, methyl isopropenyl ketone and vinylethyl ether. Specific examples of synthetic rubbers include neoprene (polychloroprene), polybutadiene (including cis 1,4 polybutadiene), polyisoprene (including cis 1,4 polyisoprene), butyl rubber, halobutyl rubber such as chlorobutyl rubber or bromobutyl rubber, styrene/isoprene/butadiene rubber, copolymers of 1,3 butadiene or isoprene with monomers such as styrene, acrylonitrile and methyl methacrylate, as well as ethylene/propylene terpolymers, also known as ethylene/propylene/diene monomer (EPDM), and in particular, ethylene/propylene/dicyclopentadiene terpolymers. Additional examples of rubbers which may be used include alkoxy-silyl end functionalized solution polymerized polymers (SBR, PBR, IBR and SIBR), silicon-coupled and tin-coupled star-branched polymers. The preferred rubber or elastomers are polyisoprene (natural or synthetic), polybutadiene and SBR.

In one aspect the at least one additional rubber is preferably of at least two of diene based rubbers. For example, a combination of two or more rubbers is preferred such as cis 1,4-polyisoprene rubber (natural or synthetic, although natural is preferred), 3,4-polyisoprene rubber, styrene/isoprene/butadiene rubber, emulsion and solution polymerization derived styrene/butadiene rubbers, cis 1,4-polybutadiene rubbers and emulsion polymerization prepared butadiene/acrylonitrile copolymers.

In one aspect of this invention, an emulsion polymerization derived styrene/butadiene (E-SBR) might be used having a relatively conventional styrene content of about 20 to about 28 percent bound styrene or, for some applications, an E SBR having a medium to relatively high bound styrene content, namely, a bound styrene content of about 30 to about 45 percent.

By emulsion polymerization prepared E-SBR, it is meant that styrene and 1,3 butadiene are copolymerized as an aqueous emulsion. Such are well known to those skilled in such art. The bound styrene content can vary, for example, from about 5 to about 50 percent. In one aspect, the E-SBR may also contain acrylonitrile to form a terpolymer rubber, as E-SBAR, in amounts, for example, of about 2 to about 30 weight percent bound acrylonitrile in the terpolymer.

Emulsion polymerization prepared styrene/butadiene/acrylonitrile copolymer rubbers containing about 2 to about 40 weight percent bound acrylonitrile in the copolymer are also contemplated as diene based rubbers for use in this invention.

The solution polymerization prepared SBR (S-SBR) typically has a bound styrene content in a range of about 5 to about 50, preferably about 9 to about 36, percent. The S-SBR can be conveniently prepared, for example, by organo lithium catalyzation in the presence of an organic hydrocarbon solvent.

In one embodiment, cis 1,4-polybutadiene rubber (BR) may be used. Such BR can be prepared, for example, by organic solution polymerization of 1,3-butadiene. The BR may be conveniently characterized, for example, by having at least a 90 percent cis 1,4-content.

The cis 1,4-polyisoprene and cis 1,4-polyisoprene natural rubber are well known to those having skill in the rubber art.

The term "phr" as used herein, and according to conventional practice, refers to "parts by weight of a respective material per 100 parts by weight of rubber, or elastomer."

The rubber composition may also include up to 70 phr of processing oil. Processing oil may be included in the rubber composition as extending oil typically used to extend elastomers. Processing oil may also be included in the rubber composition by addition of the oil directly during rubber compounding. The processing oil used may include both extending oil present in the elastomers, and process oil added during compounding. Suitable process oils include various oils as are known in the art, including aromatic, paraffinic, naphthenic, vegetable oils, and low PCA oils, such as MES, TDAE, SRAE and heavy naphthenic oils.

Suitable low PCA oils include those having a polycyclic aromatic content of less than 3 percent by weight as determined by the IP346 method. Procedures for the IP346 method may be found in Standard Methods for Analysis & Testing of Petroleum and Related Products and British Standard 2000 Parts, 2003, 62nd edition, published by the Institute of Petroleum, United Kingdom.

The rubber composition may include silica, carbon black, or a combination of silica and carbon black.

The rubber composition may include from about 1 to about 150 phr of silica. In another embodiment, from 10 to 100 phr of silica may be used.

The commonly employed siliceous pigments which may be used in the rubber compound include conventional pyrogenic and precipitated siliceous pigments (silica). In one embodiment, precipitated silica is used. The conventional siliceous pigments employed in this invention are precipitated silicas such as, for example, those obtained by the acidification of a soluble silicate, e.g., sodium silicate.

Such conventional silicas might be characterized, for example, by having a BET surface area, as measured using nitrogen gas. In one embodiment, the BET surface area may be in the range of about 40 to about 600 square meters per gram. In another embodiment, the BET surface area may be in a range of about 80 to about 300 square meters per gram. The BET method of measuring surface area is described in the Journal of the American Chemical Society, Volume 60, Page 304 (1930).

The conventional silica may also be characterized by having a dibutylphthalate (DBP) absorption value in a range of about 100 to about 400, alternatively about 150 to about 300.

The conventional silica might be expected to have an average ultimate particle size, for example, in the range of 0.01 to 0.05 micron as determined by the electron microscope, although the silica particles may be even smaller, or possibly larger, in size.

Various commercially available silicas may be used, such as, only for example herein, and without limitation, silicas commercially available from PPG Industries under the Hi-Sil trademark with designations 210, 243, etc; silicas available from Rhodia, with, for example, designations of Z1165MP and Z165GR and silicas available from Degussa AG with, for example, designations VN2 and VN3, etc. Silica pretreated or prereacted with organosilanes may also be used, such as Agilon 400 and the like from PPG.

Commonly employed carbon blacks can be used as a conventional filler in combination with silica in an amount ranging from 1 to 150 phr. In another embodiment, from 10 to 100 phr of carbon black may be used. Although carbon black may be used with silica, in one embodiment, essentially no carbon black is used except for an amount required to impart black color to the tire which is from 1 to 10 phr. Representative examples of such carbon blacks include N110, N121, N134, N220, N231, N234, N242, N293, N299, N315, N326, N330, N332, N339, N343, N347, N351, N358, N375, N539, N550, N582, N630, N642, N650, N683, N754, N762, N765, N774, N787, N907, N908, N990 and N991. These carbon blacks have iodine absorptions ranging from 9 to 145 g/kg and DBP number ranging from 34 to 150 cm3/100 g.

Combinations of silica and carbon black may be used in the composition. In one embodiment, the weight ratio of silica to carbon black is greater than or equal to one.

Other fillers may be used in the rubber composition including, but not limited to, particulate fillers including ultra high molecular weight polyethylene (UHMWPE), crosslinked particulate polymer gels including but not limited to those disclosed in U.S. Pat. Nos. 6,242,534; 6,207,757; 6,133,364; 6,372,857; 5,395,891; or 6,127,488, and plasticized starch composite filler including but not limited to that disclosed in U.S. Pat. No. 5,672,639. Such other fillers may be used in an amount ranging from 1 to 30 phr.

In one embodiment the rubber composition may contain a conventional sulfur containing organosilicon compound. In one embodiment, the sulfur containing organosilicon compounds are the 3,3'-bis(trimethoxy or triethoxy silylpropyl) polysulfides. In one embodiment, the sulfur containing organosilicon compounds are 3,3'-bis(triethoxysilylpropyl) disulfide and/or 3,3'-bis(triethoxysilylpropyl) tetrasulfide.

In another embodiment, suitable sulfur containing organosilicon compounds include compounds disclosed in U.S. Patent No. 6,608,125. In one embodiment, the sulfur containing organosilicon compounds includes 3-(octanoylthio)-1-propyltriethoxysilane, CH3(CH2)6C(=O)—S—CH$_2$CH$_2$CH$_2$Si(OCH$_2$CH$_3$)$_3$, which is available commercially as NXT from Momentive Performance Materials.

In another embodiment, suitable sulfur containing organosilicon compounds include those disclosed in U.S. Patent Publication No. 2003/0130535. In one embodiment, the sulfur containing organosilicon compound is Si-363 from Degussa.

The amount of the sulfur containing organosilicon compound in a rubber composition will vary depending on the level of other additives that are used. Generally speaking, the amount of the compound will range from 0.5 to 20 phr. In one embodiment, the amount will range from 1 to 10 phr.

It is readily understood by those having skill in the art that the rubber composition would be compounded by methods generally known in the rubber compounding art, such as mixing the various sulfur-vulcanizable constituent rubbers with various commonly used additive materials such as, for example, sulfur donors, curing aids, such as activators and retarders and processing additives, such as oils, resins including tackifying resins and plasticizers, fillers, pigments, fatty acid, zinc oxide, waxes, antioxidants and antiozonants and peptizing agents. As known to those skilled in the art, depending on the intended use of the sulfur vulcanizable and sulfur-vulcanized material (rubbers), the additives mentioned above are selected and commonly used in conventional amounts. Representative examples of sulfur donors include elemental sulfur (free sulfur), an amine disulfide, polymeric polysulfide and sulfur olefin adducts. In one embodiment, the sulfur-vulcanizing agent is elemental sulfur. The sulfur-vulcanizing agent may be used in an amount ranging from 0.5 to 8 phr, alternatively with a range of from 1.5 to 6 phr. Typical amounts of tackifier resins, if used, comprise about 0.5 to about 10 phr, usually about 1 to about 5 phr. Typical amounts of processing aids comprise about 1 to about 50 phr. Typical amounts of antioxidants comprise about 1 to about 5 phr. Representative antioxidants may be, for example, diphenyl-p-phenylenediamine and others, such as, for example, those disclosed in The Vanderbilt Rubber Handbook (1978), Pages 344 through 346. Typical amounts of antiozonants comprise about 1 to 5 phr. Typical amounts of fatty acids, if used, which can include stearic acid comprise about 0.5 to about 3 phr. Typical amounts of zinc oxide comprise about 2 to about 5 phr. Typical amounts of waxes comprise about 1 to about 5 phr. Often microcrystalline waxes are used. Typical amounts of peptizers comprise about 0.1 to about 1 phr. Typical peptizers may be, for example, pentachlorothiophenol and dibenzamidodiphenyl disulfide.

Accelerators are used to control the time and/or temperature required for vulcanization and to improve the properties of the vulcanizate. In one embodiment, a single accelerator system may be used, i.e., primary accelerator. The primary accelerator(s) may be used in total amounts ranging from about 0.5 to about 4, alternatively about 0.8 to about 1.5, phr. In another embodiment, combinations of a primary and a secondary accelerator might be used with the secondary accelerator being used in smaller amounts, such as from about 0.05 to about 3 phr, in order to activate and to improve the properties of the vulcanizate. Combinations of these accelerators might be expected to produce a synergistic effect on the final properties and are somewhat better than those produced by use of either accelerator alone. In addition, delayed action accelerators may be used which are not affected by normal processing temperatures but produce a satisfactory cure at ordinary vulcanization temperatures. Vulcanization retarders might also be used. Suitable types of accelerators that may be used in the present invention are amines, disulfides, guanidines, thioureas, thiazoles, thiurams, sulfenamides, dithiocarbamates and xanthates. In one embodiment, the primary accelerator is a sulfenamide. If a second accelerator is used, the secondary accelerator may be a guanidine, dithiocarbamate or thiuram compound.

The mixing of the rubber composition can be accomplished by methods known to those having skill in the rubber mixing art. For example, the ingredients are typically mixed in at least two stages, namely, at least one non-productive stage followed by a productive mix stage. The final curatives including sulfur-vulcanizing agents are typically mixed in the final stage which is conventionally called the "productive" mix stage in which the mixing typically occurs at a temperature, or ultimate temperature, lower than the mix temperature(s) than the preceding non-productive mix stage(s). The terms "non-productive" and "productive" mix stages are well known to those having skill in the rubber mixing art. The rubber composition may be subjected to a thermomechanical mixing step. The thermomechanical mixing step generally comprises a mechanical working in a mixer or extruder for a period of time suitable in order to produce a rubber temperature between 140° C. and 190° C. The appropriate duration of the thermomechanical working varies as a function of the operating conditions, and the volume and nature of the components. For example, the thermomechanical working may be from 1 to 20 minutes.

The rubber composition may be incorporated in a variety of rubber components of the tire. For example, the rubber component may be a tread (including tread cap and tread base), sidewall, apex, chafer, sidewall insert, wirecoat or innerliner. In one embodiment, the component is a tread.

The pneumatic tire of the present invention may be a race tire, passenger tire, aircraft tire, agricultural, earthmover, off-the-road, truck tire, and the like. In one embodiment, the tire is a passenger or truck tire. The tire may also be a radial or bias.

Vulcanization of the pneumatic tire of the present invention is generally carried out at conventional temperatures ranging from about 100° C. to 200° C. In one embodiment, the vulcanization is conducted at temperatures ranging from about 110° C. to 180° C. Any of the usual vulcanization processes may be used such as heating in a press or mold, heating with superheated steam or hot air. Such tires can be built, shaped, molded and cured by various methods which are known and will be readily apparent to those having skill in such art.

This invention is illustrated by the following examples that are merely for the purpose of illustration and are not to be regarded as limiting the scope of the invention or the manner in which it can be practiced. Unless specifically indicated otherwise, parts and percentages are given by weight.

EXAMPLE 1

In this example, the synthesis of a monomer of formula 1 is illustrated. The monomer was produced using the following scheme

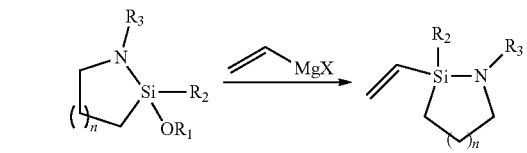

1) $R_1 = $ —OCH$_2$CH$_3$, $R_2 = $ —CH$_3$, $R_3 = $ —Si(CH$_3$)$_3$, n = 1

EXAMPLE 2

In this example, the synthesis of a functionalized elastomer via a functionalized initiator is illustrated.

The co-monomer of Example 1 was reacted with nBuLi (1:1) to produce an in-situ initiator. TMEDA (360 uL) was added to nBuLi (0.5 mL, 1.6M hexane) and preheated to 65 °C. A solution of co-monomer 1 (0.5 mL, 1.6M hexane) was added quickly and the solution was heat aged at 65 °C. for 5 min. An aliquot (240 uL, ~0.59M active Li) was added to a solution of butadiene (12.6 wt %) in hexane (115.00 g) and the polymerization was heated to 65 °C. for 1hr and terminated with a solution of BHT in 2-propanol. The cement was pan dried and the polymer yield was 96% by gravimetry. GPC analysis showed the polymer Mn=150,000/Mw=176,000 g/mol (PDI=1.17).

The invention claimed is:

1. A functionalized polymerization initiator, comprising the reaction product of an alkyl lithium compound and a compound of formula 1

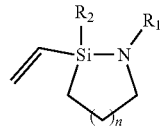

wherein $R_1$=C1—C8 alkyl, aryl, substituted aryl, or —SiR$_3$ where R is independently C1—C8 alkyl,
wherein $R_1$ optionally is one of —SiMe$_3$ where Me is methyl, or —Si(CH$_3$)$_2$C(CH$_3$)$_3$;
wherein $R_2$=C1-C8 alkyl, aryl, or substituted aryl, or —SiR$_3$;
wherein $R_2$ optionally is —CH$_3$; and
n=0-3.

2. The functionalized polymerization initiator of claim 1, wherein the compound of formula 1 is of formula 2

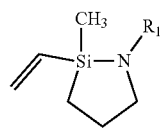

wherein $R_1$ is a C1 to C3 alkyl group, or a trimethylsilyl group.

3. The functionalized polymerization initiator of claim 1, wherein the alkyl lithium compound is selected from the group consisting of n-butyllithium, sec-butyllithium, n-hexyllithium, n-octyllithium, tertoctyllithium, n-decyllithium, phenyllithium, 1-naphthyllithium, 4-butylphenyllithium, p-tolyllithium, 4-phenylbutyllithium, cyclohexyllithium, 4-butylcyclohexyllithium, and 4-cyclohexylbutyllithium.

* * * * *